(12) United States Patent
Park et al.

(10) Patent No.: US 9,008,194 B2
(45) Date of Patent: Apr. 14, 2015

(54) LOW-POWER, HIGH-SPEED TRANSCEIVER

(75) Inventors: Hong June Park, Pohang (KR); Jong Hoon Kim, Daegu (KR); Soo Min Lee, Ulsan (KR)

(73) Assignee: Postech Academy-Industry Foundation, Pohang-Si, Gyeongsangbuk-Do (KR)

( * ) Notice: Subject to any disclaimer, the term of this patent is extended or adjusted under 35 U.S.C. 154(b) by 0 days.

(21) Appl. No.: 14/239,535

(22) PCT Filed: Dec. 14, 2011

(86) PCT No.: PCT/KR2011/009623
§ 371 (c)(1),
(2), (4) Date: Feb. 18, 2014

(87) PCT Pub. No.: WO2013/027898
PCT Pub. Date: Feb. 28, 2013

(65) Prior Publication Data
US 2014/0211834 A1    Jul. 31, 2014

(30) Foreign Application Priority Data
Aug. 19, 2011    (KR) .................... 10-2011-0082933

(51) Int. Cl.
*H04B 3/00* (2006.01)
*H04B 1/38* (2006.01)
*H04B 1/40* (2006.01)
*H04L 25/02* (2006.01)
*H04L 25/03* (2006.01)
*H04L 25/08* (2006.01)

(52) U.S. Cl.
CPC .............. *H04B 1/40* (2013.01); *H04L 25/0278* (2013.01); *H04L 25/0298* (2013.01); *H04L 25/03057* (2013.01); *H04L 25/085* (2013.01); *H04L 2025/0377* (2013.01); *H04L 25/03949* (2013.01)

(58) Field of Classification Search
USPC .................................. 375/219–220, 257, 377
See application file for complete search history.

(56) References Cited

U.S. PATENT DOCUMENTS

| | | | | |
|---|---|---|---|---|
| 5,467,455 | A * | 11/1995 | Gay et al. ...................... | 710/100 |
| 6,493,394 | B2 | 12/2002 | Tamura et al. | |
| 2002/0030517 | A1* | 3/2002 | Kurisu et al. ................. | 327/108 |
| 2005/0261846 | A1* | 11/2005 | Roach ............................. | 702/64 |
| 2006/0259256 | A1* | 11/2006 | Roach ............................. | 702/64 |
| 2007/0176628 | A1* | 8/2007 | Takagi ............................ | 326/30 |
| 2010/0272215 | A1* | 10/2010 | Lin et al. ....................... | 375/316 |
| 2011/0293041 | A1* | 12/2011 | Luo et al. ...................... | 375/316 |

FOREIGN PATENT DOCUMENTS

| | | |
|---|---|---|
| JP | 3-284014 | 12/1991 |
| JP | 10-275038 | 10/1998 |
| JP | 11-177540 | 7/1999 |
| JP | 2004-254155 | 9/2004 |
| KR | 10-2004-0075783 | 8/2004 |
| KR | 10-2009-0036243 | 4/2009 |

OTHER PUBLICATIONS

International Search Report for International Application No. PCT/KR2011009623, dated Aug. 28, 2012.

* cited by examiner

*Primary Examiner* — Khanh C Tran
(74) *Attorney, Agent, or Firm* — Kile Park Reed & Houtteman PLLC

(57) ABSTRACT

The present invention relates to a low-power and high-speed transmission and reception apparatus which reduces consumption power of a sending-end circuit by increasing a value of a termination resistor included in a sending-end circuit and a receiving-end circuit so that the value is greater than a characteristic impedance value of a transmission line.

14 Claims, 6 Drawing Sheets

LOW-POWER, HIGH-SPEED TRANSCEIVER

BACKGROUND OF THE INVENTION

1. Field of the Invention

The present invention relates to a low-power and high-speed transceiver, and more particularly, to a low-power and high-speed transceiver capable of reducing consumption power of a transmission apparatus by increasing resistance at the termination of the transmission and reception apparatus.

2. Description of the Related Art

In general, in a signal transmission apparatus, a termination resistor included in each of a sending-end circuit and a receiving-end circuit has the same value as the characteristic impedance value of a transmission line in order to prevent the occurrence of a reflected wave.

In the transmission of a signal, the size of a transmitted signal is determined by the product of a resistance value of a termination resistor and an electric current consumed by a sending-end circuit.

Characteristic impedance of a common transmission line has a small value of about 50 Ohm. Accordingly, a resistance value of a termination resistor is also determined to be 50 Ohm. Power consumed by the termination resistor occupies most of the entire consumption power of a high-speed transmission apparatus.

It is very important to lower consumption power of a sending-end circuit, which occupies most of the power consumption in that the most important part in developing the high-speed transmission apparatus is low power.

If a resistance value of the termination resistor is determined to be the same as characteristic impedance of the transmission line according to a conventional method, an electric current consumed by the sending-end circuit cannot be reduced.

SUMMARY OF THE INVENTION

The present invention has been made to solve the problems occurring in the related art, and an object of the present invention is to provide a low-power and high-speed transmission and reception apparatus, which reduces consumption power of a sending-end circuit by increasing a resistance value of a termination resistor included in the sending-end circuit and a receiving-end circuit so that the resistance value is greater than a characteristic impedance value of a transmission line.

Another object of the present invention is to provide a low-power and high-speed transmission and reception apparatus, which compensates for an electromagnetic wave reflection phenomenon and an Inter-Symbol Interference (hereinafter referred to as 'ISI') phenomenon generated at the ends of a sending-end circuit and a receiving-end circuit due to an increase of a termination resistance value.

In order to achieve the above object, a low-power and high-speed transmission and reception apparatus according to the present invention includes a sending-end circuit sending an input signal; a receiving-end circuit receiving the signal from the sending-end circuit; a transmission line connected to the sending-end circuit and the receiving-end circuit in series, for transferring the signal from the sending-end circuit to the receiving-end circuit; and a termination resistor included in at least one of the sending-end circuit and the receiving-end circuit, wherein a value of the termination resistor is greater than a characteristic impedance value of the transmission line.

Here, the value of the termination resistor may be 1.5 times greater than the characteristic impedance value of the transmission line.

Furthermore, the receiving-end circuit may include a Decision Feedback Equalization (DFE) circuit for compensating for at least one of an electromagnetic wave reflection phenomenon generated due to mismatch between a value of the termination resistor and characteristic impedance of the transmission line and an Inter-Symbol Interference (ISI) increase phenomenon attributable to a value of the termination resistor.

That is, the sending-end circuit may send a data pattern for removing a skew between data and a clock, included in a signal to be received by the receiving-end circuit, to the receiving-end circuit before actually sending a signal, and the receiving-end circuit may perform a deskew operation on the signal to be received using the received data pattern.

Here, the data pattern may be a pattern in which '1' and '0' are alternately repeated, and the receiving-end circuit may generate a clock signal having an edge matched with a dead center of a period of the received data pattern and perform the deskew operation.

Furthermore, the sending-end circuit may send a pulse signal for measuring a reflection time and reflected size of the electromagnetic wave and a size of the ISI to the receiving-end circuit before actually sending a signal, and the receiving-end circuit may measure the reflection time and reflected size of the electromagnetic wave and the size of the ISI using the received pulse signal through the DFE circuit and compensate for the electromagnetic wave reflection phenomenon and the ISI based on the measured reflection time and reflected size of the electromagnetic wave and the measured size of the ISI.

Here, the pulse signal may be a periodic single-1 pulse signal in which '1' is in a 1-bit time interval of data and '0' continues to remain in a remaining time interval, and the receiving-end circuit may measure and compensate for the reflection time and reflected size of the electromagnetic wave and the size of the ISI based on a point of time at which the '1' was received during one period of the single-1 pulse signal through the DFE circuit.

Here, the receiving-end circuit may determine the reflection time and reflected size of an electromagnetic wave, belonging to the taps of the DFE circuit received based on the time when the '1' is received, and the positions and coefficients if the taps for measuring the size of the ISI and compensate for the electromagnetic wave reflection phenomenon and the ISI using the determined positions and coefficients of the taps.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

The above object, characteristics, and merits of the present invention will become more apparent from the following detailed description taken in conjunction with the accompanying drawings. Preferred embodiments of the present invention are described in detail below with reference to the accompanying drawings.

Figure 1:
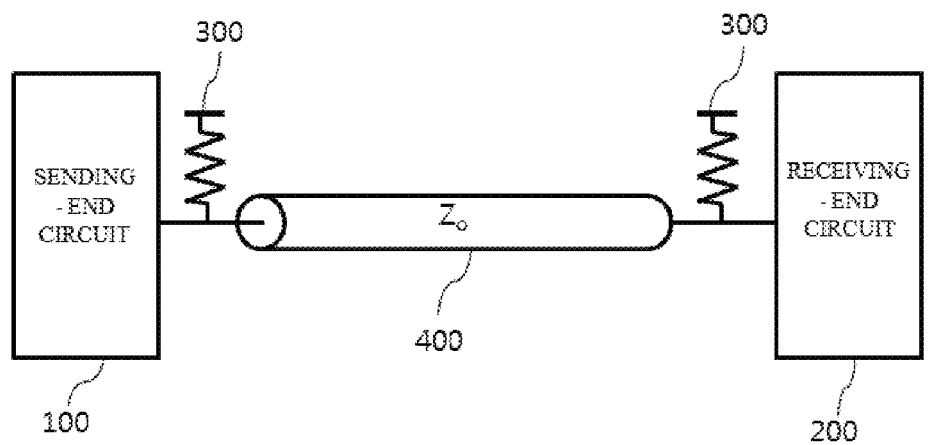
FIG. 1 is a diagram showing a low-power and high-speed transmission and reception apparatus according to the present invention.

FIG. 1 is a diagram showing a low-power and high-speed transmission and reception apparatus according to the present invention.

Referring to FIG. 1, the low-power and high-speed transmission and reception apparatus according to the present invention includes a sending-end circuit 100 for sending a received signal, a receiving-end circuit 200 for receiving a signal from the sending-end circuit 100, termination resistors 300 provided between the sending-end circuit 100 and the receiving-end circuit 200, and a transmission line 400 connected to the sending-end circuit 100 and the receiving-end circuit 200 in series and for transferring a signal received from the sending-end circuit 100 to the receiving-end circuit 200.

The low-power and high-speed transmission and reception apparatus according to the present invention may include elements (e.g., memory, a user input unit, a display unit, a speaker, and a microphone) other than the aforementioned elements, if necessary, but a detailed description of the elements other than the aforementioned elements is omitted for simplicity because the elements are not directly related to the present invention.

The termination resistor 300 according to the present invention may have a resistance value greater than a characteristic impedance value Zo of the transmission line 400, thereby being capable of reducing transmission power of the sending-end circuit 100.

Preferably, a resistance value of the termination resistor 300 may be 1.5 times a characteristic impedance value Zo of the transmission line 400.

In the description of the present invention of FIGS. 2 to 10, a resistance value of the termination resistor 300 is assumed to be 4 times a characteristic impedance value Zo of the transmission line 400, and thus it can be seen that consumption power of the sending-end circuit 100 is reduced by ¼ as compared with a prior art. Here, if a resistance value of the termination resistor 300 is 4 times a characteristic impedance value Zo of the transmission line 400, the amplitude of a signal transmitted by the sending-end circuit 100 maintains the same level.

Meanwhile, if a resistance value of the termination resistor 300 is greater than a characteristic impedance value Zo of the transmission line 400 as in the present invention, transmission power of the sending-end circuit 100 is reduced, but an electromagnetic wave reflection phenomenon attributable to mismatch between a value of the termination resistor 300 and a characteristic impedance value Zo of the transmission line 400 and an Inter-Symbol Interference (ISI) increase phenomenon attributable to an increase in the value of the termination resistor 300 may be generated.

Accordingly, in the present invention, a Decision Feedback Equalization (hereinafter referred to 'DFE') circuit 220 for measuring and compensating for the time when an electromagnetic wave is reflected, the size of a reflected electromagnetic wave, and the size of ISI is included in the receiving-end circuit 200.

Here, the electromagnetic wave reflection phenomenon is characterized in that it appears every twice times the propagation time of the transmission line 400 and continues for a long time, but continuous duration is intermittently generated.

Accordingly, the taps of the DFE circuit 220 for compensating the reflection of an electromagnetic wave and ISI are not implemented for all time intervals, but only taps corresponding to a time interval in which the reflection of an electromagnetic wave and ISI are generated are implemented using the characteristic, thereby being capable of reducing power consumption of the receiving-end circuit 200.

That is, in order to compensate for ISI phenomenon using the DFE circuit 220, the number of taps is limited to a limited number between one and five, but the number of taps necessary to compensate for an electromagnetic wave reflection phenomenon using the DFE circuit 220 is 2×(the number of reflected waves)×(a propagation time of a transmission line)×(a data transfer rate), which is too many.

If all the taps described above are to be received in the DFE circuit 220 of the receiving-end circuit 200, the DFE circuit 220 is excessively increased, with the result that the size of the receiving-end circuit 200 and power consumption are increased.

However, the electromagnetic wave reflection phenomenon is characterized in that it is not continuously generated in relation to time as described above, but it is gathered and generated at an interval of a time zone that is a positive number times the propagation time of a transmission line. Accordingly, if such a characteristic is used, power consumption of the receiving-end circuit 200 can be reduced by significantly reducing the number of taps.

Meanwhile, in the transmission and reception apparatus according to the present invention, the sending-end circuit 100 sends data and a clock together, and the receiving-end circuit 200 uses the received clock as an input clock to the DFE circuit 220 for compensating for an electromagnetic wave reflection phenomenon and the distortion of ISI generated in the received data.

Furthermore, the transmission and reception apparatus according to the present invention may adopt a differential signaling method and a single-ended signaling method.

Figure 2:
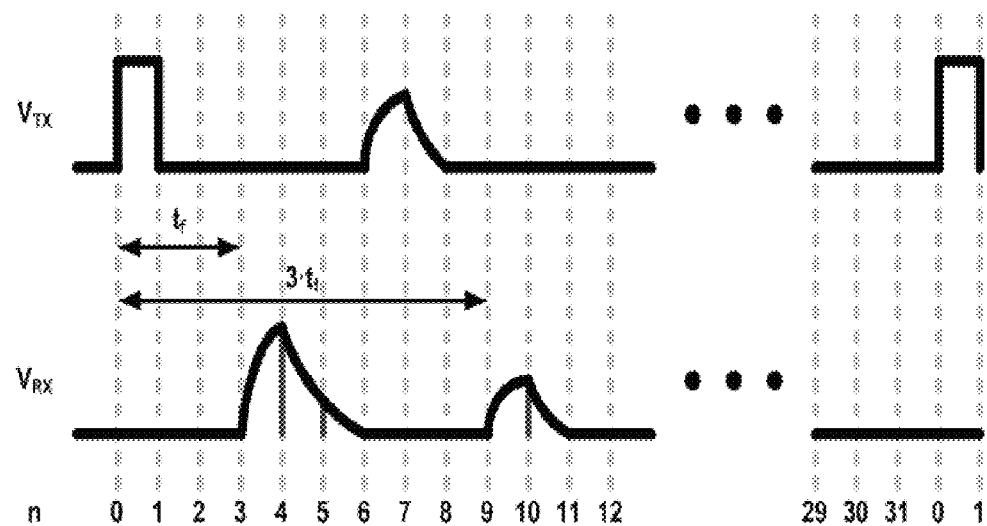
FIG. 2 is a diagram showing a signal waveform for a single-1 pulse signal that is used to measure the reflection time and reflected size of an electromagnetic wave in a receiving-end circuit and the size of Inter-Symbol Interference (ISI) according to the present invention.

FIG. 2 is a diagram showing a signal waveform for a single-1 pulse signal that is used to measure the reflection time and reflected size of an electromagnetic wave in the receiving-end circuit and the size of ISI according to the present invention.

Referring to FIG. 2, the single-1 pulse signal has a total length of 32 bits and is a pulse signal '1000 . . . 00' in which '1' is for only a 1-bit time and '0' continues to remain in the remaining times.

Furthermore, FIG. 2 shows a signal waveform in brief in a sending end $V_{TX}$ and a receiving end $V_{RX}$ when the sending-end circuit 100 repeatedly sends the single-1 pulse signal '1000000000000 . . . '.

Here, a total number (assumed to be '32' in FIG. 2) of the single-1 pulse signals is determined to be a value greater than the number of taps of the DFE circuit 220 [2×(a maximum reflection number)×(a transmission line propagation time)×(a data transfer rate)] so that both the ISI effect of the transmission line 400 and a reflected wave effect occurring due to impedance mismatch appear in one period of the single-1 pulse signal.

That is, as the sending-end circuit 100 periodically sends the single-1 pulse signal '10000 . . . 00', after the single-1 pulse signal is transmitted, the single-1 pulse signal reaches the receiving-end circuit 200 after the propagation time $t_f$ of the transmission line 400.

Here, the received single-1 pulse signal includes a post cursor for a specific time due to the ISI effect of the transmission line 400.

The received single-1 pulse signal generates a reflected wave due to the impedance mismatch of the termination resistor 300, and the generated reflected wave reaches the receiving-end circuit 200 after 3 $t_f$ after the single-1 pulse signal is received.

In an embodiment of the present invention, it is assumed that one post cursor is generated due to the ISI effect and the influence of the reflected wave continues for only one data period.

In FIG. 2, the propagation time $t_f$ of the transmission line 400 is assumed to be 3T. Here, T indicates one date period.

Figure 3:
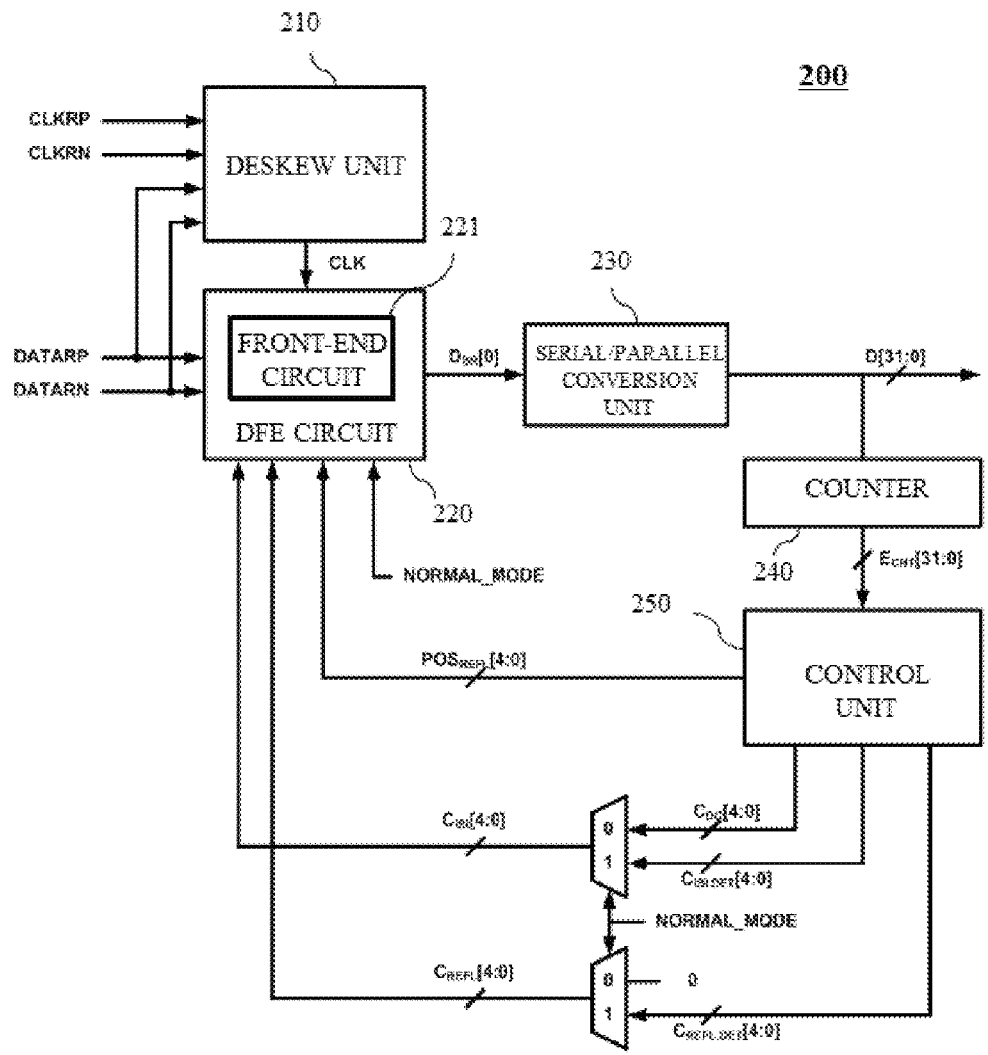
FIG. 3 is a diagram showing the receiving-end circuit according to the present invention.

FIG. 3 is a diagram showing the receiving-end circuit according to the present invention.

Referring to FIG. 3, the receiving-end circuit 200 according to the present invention includes a deskew unit 210, the DFE circuit 220, a serial/parallel conversion unit 230, a counter 240, and a control unit 250.

The low-power and high-speed transmission and reception apparatus according to the present invention may be configured to include elements other than the aforementioned elements, if necessary, but a detailed description of the elements other than the aforementioned elements is omitted for simplicity because the elements are not directly related to the present invention.

Prior to a description of an operational process of the elements of the receiving-end circuit 200, before actually sending a signal to the receiving-end circuit 200, the sending-end circuit 100 sends a data pattern for removing a skew between data and a clock, included in a signal to be received by the receiving-end circuit 200, to the receiving-end circuit 200 for the correct data restoration operation of the DFE circuit 220.

Here, the data pattern may be a '1010 . . . ' pattern in which '1' and '0' are alternately repeated.

The deskew unit 210 performs a deskew operation for removing a skew between the data and the clock received from the sending-end circuit 100.

That is, the deskew unit 210 places a rising edge of the clock at the dead center of a data period using the data pattern in which the '1010 . . . ' is repeated.

Next, when the deskew operation of the deskew unit 210 is completed, the sending end 100 sends a single-1 pulse signal, used by the receiving end 200 in order to measure an electromagnetic wave reflection phenomenon and an ISI increase phenomenon and already described with reference to FIG. 2, to the receiving end 200.

The control unit 250 controls the overall operation of the receiving-end circuit 200 according to the present invention and searches the single-1 pulse signal, received from the sending end 100, for the time when '1' was received, the size of ISI, the time when a reflected wave was received, and the size of the reflected wave by controlling the DFE circuit 220.

That is, the DFE circuit 220 searches the single-1 pulse signal for the time when '1' was received, the size of ISI, the time when a reflected wave was received, and the size of the reflected wave under the control of the control unit 250 and compensates for the electromagnetic wave reflection phenomenon and ISI increase phenomenon based on the retrieved time when '1' was received, the size of ISI, the time when a reflected wave was received, and the size of the reflected wave.

Meanwhile, the serial/parallel conversion unit 230 converts a signal output from the DFE circuit 220 into a parallel signal and outputs the parallel signal. The counter 240 feeds some of the signal output from the serial/parallel conversion unit 230 back to the control unit 250.

Hereafter, a process of searching the received single-1 pulse signal for the time when '1' was received, the size of ISI, the time when a reflected wave was received, and the size of the reflected wave through the DFE circuit 220 is named a training mode.

That is, the control unit 250 determines taps $C_{ISI}[4:0]$, $C_{REFL}[4:0]$, and $POS_{REFL}[4:0]$ that are necessary to restore actual data through the DFE circuit 220 in the training mode.

Here, an operation in the training mode implements a training function using a front-end circuit 221 included in the DFE circuit 220.

In the training mode, single-1 pulse signals '10000 . . . 00' of 32 bits that are repeatedly received from the sending-end circuit 100 are used as a data pattern.

Figure 4:
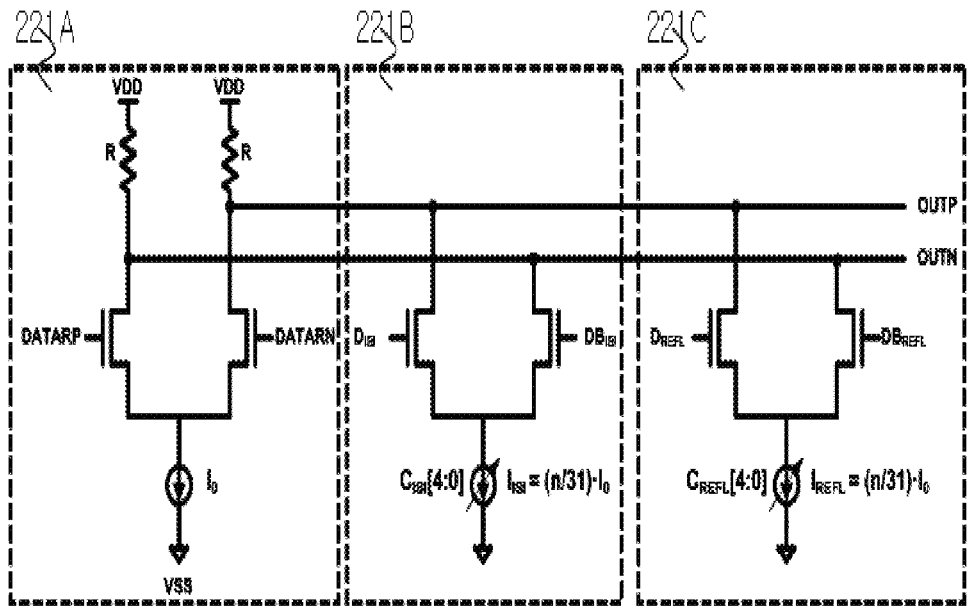
FIGS. 4 to 6 are diagrams showing a front-end circuit according to the present invention.

FIG. 4 is a diagram showing the front-end circuit according to the present invention.

Referring to FIG. 4, the front-end circuit 221 includes a main driver 221A for receiving input data DATARP and DATARN and two first and second sub-drivers 221B and 221C for receiving respective selected previous data $D_{ISI}$ ($DB_{ISI}$) and $D_{REFL}$($DB_{REFL}$). The taps of the first and the second sub-drivers 221B and 221C are adjusted to be $C_{ISI}[4:0]$ and $C_{REFL}[4:0]$, that is, 5-bit coefficients.

Here, as shown in FIG. 4, a resistance load main differential amplifier may become the main driver 221A, one or more auxiliary differential amplifiers for ISI compensation may become the first sub-driver 221B, and one or more auxiliary differential amplifiers for reflected wave compensation may become the second sub-driver 221C.

Furthermore, the front-end circuit 221 has a structure in which the output terminals of the main driver 221A, the first sub-driver 221B, and the second sub-driver 221C are connected in parallel.

Here, under the control of the control unit 250, a ratio of a value of a tail current source connected to the common source terminal of the first sub-driver 221B and a ground terminal (or supply voltage terminal) and a value of a tail current source connected to the common source terminal of the main driver 221A and the ground terminal (or supply voltage terminal) is adjusted to be the same as an ISI coefficient.

Furthermore, under the control of the control unit 250, a ratio of a value of a tail current source connected to the common source terminal of the second sub-driver 221C and the ground terminal (or supply voltage terminal) and a value of a tail current source connected to the common source terminal of the main driver 221A and the ground terminal (or supply voltage terminal) is adjusted to be the same as the coefficient of a reflected wave.

The control unit 250 applies a previously received differential data signal or a previously received single data signal and a reference voltage to the input terminal of the main driver 221A.

Furthermore, when performing an operating of searching for the size of ISI and the position and size of a reflected wave, the control unit 250 applies voltage of the supply voltage terminal VDD or the ground terminal VSS to the input terminals of the first sub-driver 221B and the second sub-driver 221C. When performing an operation of actually sending a signal, the control unit 250 applies previous digital data at a corresponding point of time that generates ISI and the influence of a reflected wave.

Figure 7:
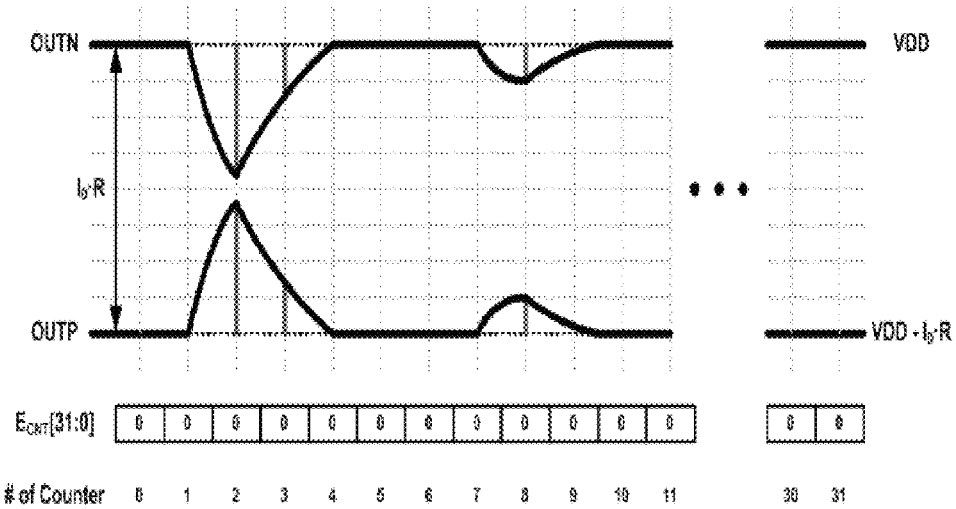
FIG. 7 is a diagram showing an output waveform of the front-end circuit and the output of a counter according to the present invention.

FIG. 7 shows output waveforms OUTP and OUTN and the outputs $E_{CNT}[31:0]$ of 32 2-bit counters 240 for counting 32-bit data that has been made parallel in 32 bits from received data when a single-1 pulse signal is inputted to the front-end circuit of FIG. 4.

In the first process of the training mode, the control unit 250 searches the single-1 pulse signal, received through the DFE circuit 220, for the time when '1' was received.

The control unit 250 assigns $C_{ISI}[4:0]$, belonging to two coefficient values $C_{ISI}[4:0]$ and $C_{REFL}[4:0]$ of the DFE circuit 220, as $C_{DC}[4:0]$ and sets '0' to $C_{REFL}[4:0]$ because the coefficient value $C_{REFL}[4:0]$ is not used.

That is, the operation of the front-end circuit 221 in the training mode is performed as in FIG. 5 below.

Figure 5:
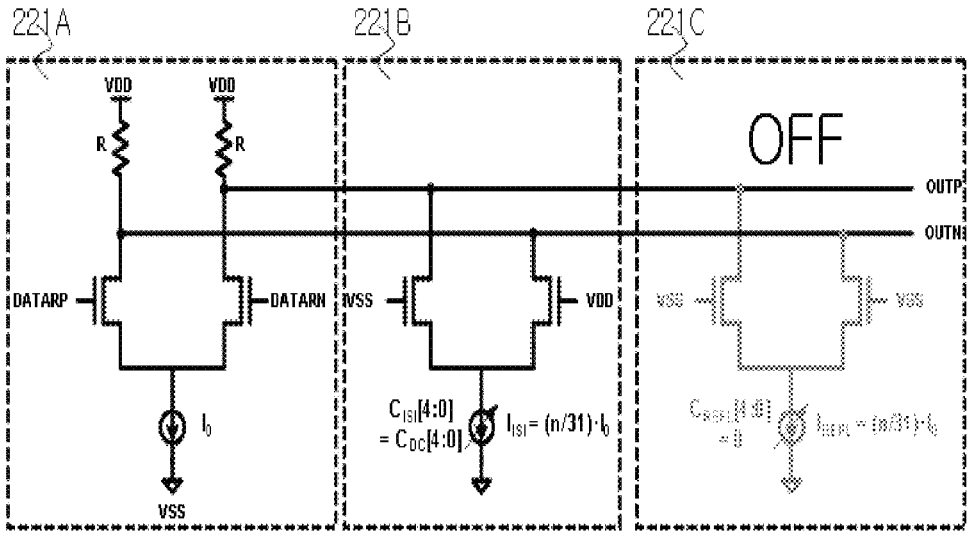
Figure 6:
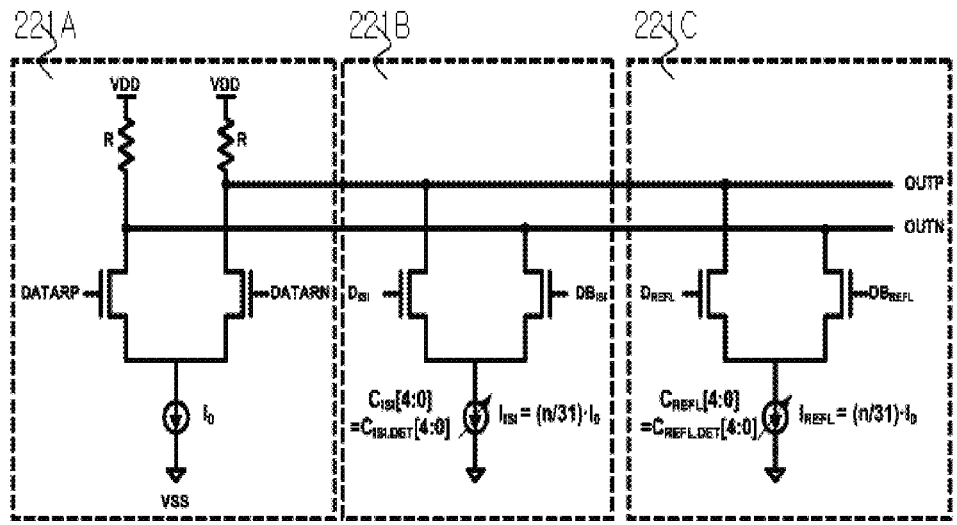

Referring to FIG. 5, the main driver 221A operates using the input data DATARP and DATARN as inputs. A current value $C_{DC}[4:0]$ is inputted to the first sub-driver 221B for removing ISI under the control of the control unit 250, and the operation of the first sub-driver 221B is controlled in response to the current value $C_{DC}[4:0]$.

Here, the second sub-driver 221C of FIG. 5 is fully turned off because the second sub-driver 221C does not perform any function and thus both the input data $D_{REFL}$ and $DB_{REFL}$ and the current coefficient $C_{REFL}[4:0]$ become '0'.

Figure 8:
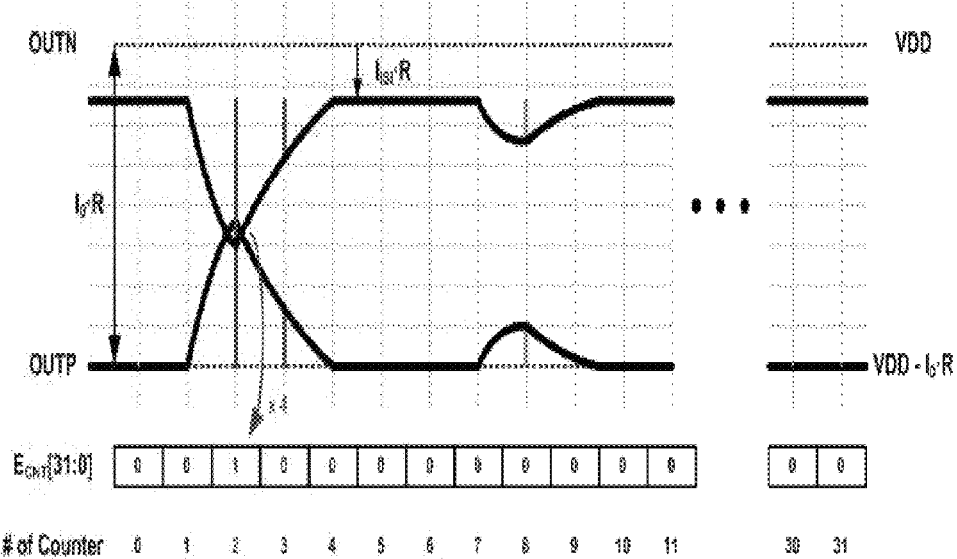
FIG. 8 is a diagram showing a process of setting the position of a received pulse signal using a DFE circuit according to the present invention.

In this state, when the current value $C_{DC}[4:0]$ that was first set to '0' is increased by 1 bit, a DC level of the output waveform OUTN that belongs to the output waveforms OUTP and OUTN of the front-end circuit 221 is changed, with the result that the two output waveforms OUTP and OUTN cross each other at a specific current value $C_{DC}[4:0]$ as shown in FIG. 8.

The counter 240 checks that the two output waveforms OUTP and OUTN cross each other. A counter output at a corresponding point of time is made '1' if such a crossing at the same point of time is generated four times.

When the counter output is first generated from the counter 240, the control unit 250 recognizes a point of time at which the first counter output was generated as a point of time at which '1' of a single-1 pulse signal was received and stores the point of time at which the first counter output was generated.

Next, in the second process of the training mode, the control unit 250 measures the size of ISI through the DFE circuit 220 and determines a coefficient of DFE $C_{ISI\_DET}[4:0]$ for removing the measured ISI.

In the same state as that of the first process of the training mode, the control unit1 250 increases the current value $C_{DC}[4:0]$ by 1 bit by controlling the DFE circuit 220.

Figure 9:
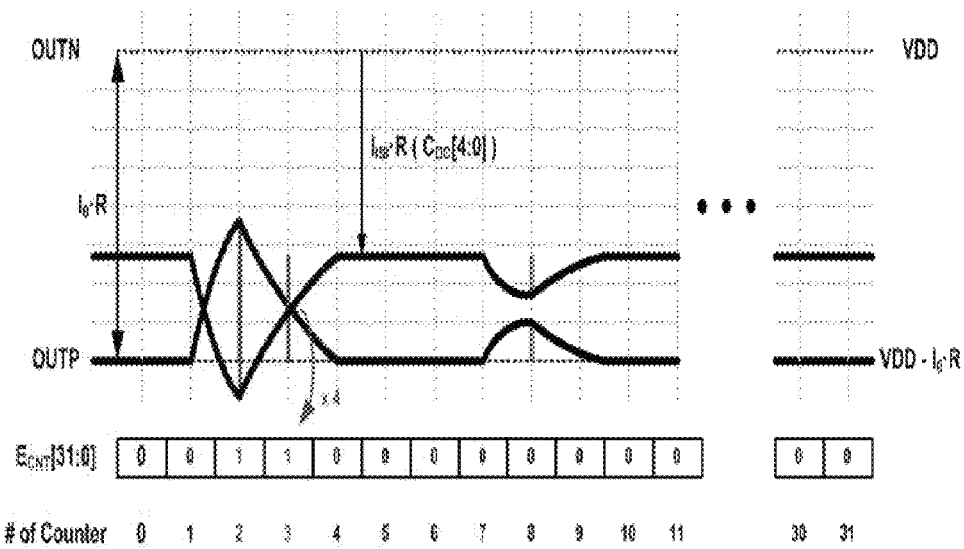
FIG. 9 is a diagram showing a process of setting the size of a post cursor of 1 tap using the DFE circuit according to the present invention.

If the current value $C_{DC}[4:0]$ is increased by 1 bit, an intersecting point is generated due to ISI at a point of time that has elapsed by one data period from the point of time at which '1' of the single-1 pulse signal retrieved in the first process of the training mode was received, as shown in FIG. 9.

Like in the first process of the training mode, the counter 240 checks the generation of the intersecting point, and a counter output at a corresponding point of time is made '1' if such a crossing at the same point of time is generated four times. The control unit 250 calculates $C_{ISI\_DET}[4:0]$, that is, a coefficient of the DFE circuit 220 and stores the calculated coefficient.

The coefficient $C_{ISI\_DET}[4:0]$ is the same as a value obtained by subtracting a DC level $C_{DC}[4:0]$, dropped until the intersecting point is generated, from a total DC level of the front-end circuit 221.

Accordingly, '$C_{ISI\_DET}[4:0]=31-C_{DC}[4:0]$'.

Next, in the third process of the training mode, the control unit 250 measures the time when a reflected wave is received and the size of the reflected wave through the DFE circuit 220 as shown in FIG. 2 and determines a coefficient $C_{REFL\_DET}[4:0]$ of DFE for removing the influence of the reflected wave and a position $POS_{REFL}[4:0]$ of previous data fed back by the counter 240.

That is, like in the first and the second processes, the control unit 250 increases the current value $C_{DC}[4:0]$ again by 1 bit.

If the current value $C_{DC}[4:0]$ is increased by 1 bit, the counter 240 checks whether an intersecting point is generated at a point where the reflected wave is present. If the intersecting point is generated four times at the same point of time as shown in FIG. 10, a counter output at the corresponding point of time is made '1'.

Here, the control unit 250 calculates the coefficient $C_{REFL\_DET}[4:0]$ as '$C_{REFL\_DET}[4:0]=31-C_{DC}[4:0]$' using a current $C_{DC}[4:0]$ like in ISI and stores the calculated coefficient.

Furthermore, the control unit 180 calculates the position of previous data that is fed back using the point of time at which '1' of the single-1 pulse signal was received, stored in the first process of the training mode, and the point of time at which the reflected wave was generated.

Figure 10:
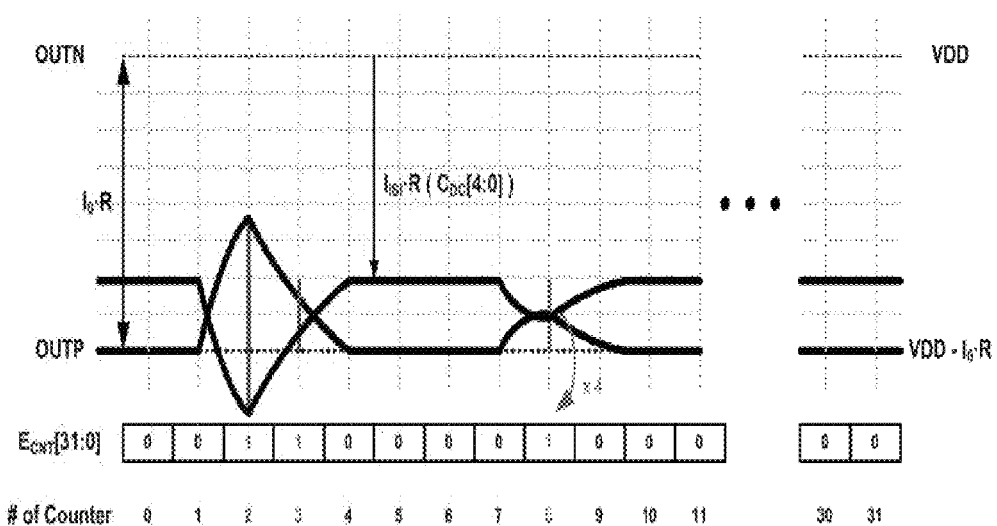
FIG. 10 is a diagram showing a process of setting the size and position of a reflected wave using the DFE circuit according to the present invention.

As shown in FIG. 10, '$POS_{REFL}[4:0]=8-2-1=5$' because the reflected wave has been generated at a point of time after six data periods from the point of time at which '1' of the single-1 pulse signal was generated.

When all the three parameters $C_{ISI\_DET}[4:0]$, $C_{REFL\_DET}[4:0]$, and $POS_{REFL}[4:0]$ are determined in the training mode as described above, the control unit 180 terminates the training mode and controls the DFE circuit 220 so that the DFE circuit 220 operates in normal mode.

As is apparent from the above description, the low-power and high-speed transmission and reception apparatus according to the present invention has an advantage in that it can reduce power consumption of the sending-end circuit by increasing a value of the termination resistor included in each of the sending-end circuit and the receiving-end circuit so that the value is greater than a characteristic impedance value of the transmission line.

Furthermore, the low-power and high-speed transmission and reception apparatus according to the present invention improves reliability of the low-power and high-speed transmission and reception apparatus by measuring the reflection of an electromagnetic wave and ISI generated due to an increase of a value of the termination resistor in the receiving-end circuit and compensating for the reflection of an electromagnetic wave and the ISI.

It is evident to those skilled in the art that the present invention may be materialized in other specific forms without departing from the spirit and essential characteristics of the present invention.

Accordingly, the detailed description should not be construed as being limited from all aspects, but should be considered to be illustrative.

The scope of the present invention should be determined by reasonable analysis of the attached claims, and all changes within the equivalent range of the present invention are included in the scope of the present invention

What is claimed is:

1. A low-power and high-speed transmission and reception apparatus, comprising:
a sending-end circuit sending a signal;
a receiving-end circuit receiving the signal from the sending-end circuit;
a transmission line connected to the sending-end circuit and the receiving-end circuit, for transferring the signal from the sending-end circuit to the receiving-end circuit; and
a termination resistor provided between the transmission line and at least one of the sending-end circuit and the receiving-end circuit,
wherein a value of the termination resistor is greater than a characteristic impedance value of the transmission line, and the receiving-end circuit comprises a compensating circuit that compensates at least one of a reflected wave and an interference, which are generated in association with one or both of the value of the termination resistor and the characteristic impedance value of the transmission line.

2. The low-power and high-speed transmission and reception apparatus of claim 1, wherein the value of the termination resistor is 1.5 times greater than the characteristic impedance value of the transmission line.

3. The low-power and high-speed transmission and reception apparatus of claim 1, wherein the compensating circuit is a Decision Feedback Equalization circuit, the reflected wave is an electromagnetic wave reflection phenomenon generated due to mismatch between a value of the termination resistor and characteristic impedance of the transmission line, and the interference is an Inter-Symbol interference increase phenomenon attributable to a value of the termination resistor.

4. The low-power and high-speed transmission and reception apparatus of claim 3, wherein:
the sending-end circuit sends a data pattern for removing a skew between data and a clock, included in the signal to be received by the receiving-end circuit, to the receiving-end circuit before actually sending the signal, and
the receiving-end circuit performs a deskew operation on the signal to be received using the received data pattern.

5. The low-power and high-speed transmission and reception apparatus of claim 4, wherein:
the data pattern is a pattern in which '1' and '0' are alternately repeated, and
the receiving-end circuit generates a clock signal having an edge matched with a dead center of a period of the received data pattern and performs the deskew operation.

6. The low-power and high-speed transmission and reception apparatus of claim 3, wherein:
the sending-end circuit sends a pulse signal for measuring a reflection time and reflected size of the electromagnetic wave reflection phenomenon and a size of the Inter Symbol Interference to the receiving-end circuit before actually sending the signal, and
the receiving-end circuit measures the reflection time and the reflected size of the electromagnetic wave reflection phenomenon and the size of the Inter-Symbol Interference using the received pulse signal through the Decision Feedback Equalization circuit and compensates for the electromagnetic wave reflection phenomenon and the Inter-Symbol Interference based on the measured reflection time and the reflected size of the electromagnetic wave reflection phenomenon and the measured size of the Inter-Symbol Interference.

7. The low-power and high-speed transmission and reception apparatus of claim 6, wherein the pulse signal is a periodic single-1 pulse signal in which '1' is in a 1-bit time interval of data and '0' continues to remain in a remaining time interval.

8. The low-power and high-speed transmission and reception apparatus of claim 7, wherein the receiving-end circuit measures the reflection time and the reflected size of the electromagnetic wave reflection phenomenon and the size of the Inter-Symbol Interference and compensates for the reflection time and the reflected size of the electromagnetic wave reflection phenomenon and the size of the Inter-Symbol Interference based on a point of time at which the '1' was received during one period of the periodic single-1 pulse signal through the Decision Feedback Equalization circuit.

9. The low-power and high-speed transmission and reception apparatus of claim 8, wherein the receiving-end circuit measures all of the reflection time and the reflected size of the electromagnetic wave reflection phenomenon and the size of Inter-Symbol Interference using one identical front-end circuit included in the Decision Feedback Equalization circuit based on the point of time at which the '1' was received, determines all positions and coefficient values of Decision Feedback Equalization taps using the measured values, and compensates for the electromagnetic wave reflection phenomenon and the Inter-Symbol Interference using the determined positions and coefficients of the Decision Feedback Equalization taps.

10. The low-power and high-speed transmission and reception apparatus of claim 9, wherein in order to compensate for the electromagnetic wave reflection phenomenon appearing at a receiving end using the Decision Feedback Equalization circuit, all Decision Feedback Equalization taps corresponding to all time intervals in which the electromagnetic wave reflection phenomenon continues are not used, but only Decision Feedback Equalization taps corresponding to several time intervals that are twice a propagation time of the transmission line, that is, a time interval where the electromagnetic wave reflection phenomenon appears, are used.

11. The low-power and high-speed transmission and reception apparatus of claim 7, wherein the receiving-end circuit measures all of the reflection time and the reflected size of the electromagnetic wave reflection phenomenon and the size of the Inter-Symbol Interference using one identical front-end circuit included in the Decision Feedback Equalization circuit based on the point of time at which the '1' was received, determines all positions and coefficient values of Decision Feedback Equalization taps using the measured values, and compensates for the electromagnetic wave reflection phenomenon and the Inter-Symbol Interference using the determined positions and coefficients of the Decision Feedback Equalization taps.

12. The low-power and high-speed transmission and reception apparatus of claim 11, wherein in order to compensate for the electromagnetic wave reflection phenomenon appearing at a receiving end using the Decision Feedback Equalization circuit, all Decision Feedback Equalization taps corresponding to all time intervals in which the electromagnetic wave reflection phenomenon continues are not used, but only Decision Feedback Equalization taps corresponding to several time intervals that are twice a propagation time of the transmission line, that is, a time interval where the electromagnetic wave reflection phenomenon appears, are used.

13. The low-power and high-speed transmission and reception apparatus of claim 1, wherein the transmission of the signal including the data and the clock through the transmission line is performed using a differential signaling method or a single-ended signaling method.

14. The low-power and high-speed transmission and reception apparatus of claim 1, wherein the low-power and high-speed transmission and reception apparatus sends one clock signal or sends one datum or a plurality of data in parallel.

* * * * *